United States Patent [19]

Elmi

[11] Patent Number: 5,500,132

[45] Date of Patent: Mar. 19, 1996

[54] LIQUID TO LIQUID COALESCING SEPARATOR AND METHOD

[75] Inventor: Hadi Elmi, The Woodlands, Tex.

[73] Assignee: Modern Welding Company, Inc., Houston, Tex.

[21] Appl. No.: 387,886

[22] PCT Filed: Aug. 27, 1993

[86] PCT No.: PCT/US93/08087

§ 371 Date: Feb. 22, 1995

§ 102(e) Date: Feb. 22, 1995

[87] PCT Pub. No.: WO94/05602

PCT Pub. Date: Mar. 17, 1994

[51] Int. Cl.⁶ .................................................. C02F 1/40
[52] U.S. Cl. .................... 210/708; 210/803; 210/521; 210/540; 210/DIG. 5
[58] Field of Search .................. 210/519, 521, 210/522, 532.1, 538, 542, 702, 703, 708, 800, 802, 803, DIG. 5

[56] References Cited

U.S. PATENT DOCUMENTS

| | | |
|---|---|---|
| 2,363,009 | 11/1944 | Lewis ........................ 210/DIG. 5 |
| 3,399,135 | 8/1968 | Conley, Jr. et al. ............ 210/521 |
| 3,613,889 | 10/1971 | Reed ............................ 210/522 |
| 3,957,656 | 5/1976 | Castelli ........................ 210/521 |
| 4,059,317 | 11/1977 | Strahorn et al. .............. 210/540 |
| 4,132,652 | 1/1979 | Anderson et al. ........ 210/DIG. 5 |
| 4,157,969 | 6/1979 | Thies ............................ 210/521 |
| 4,257,895 | 3/1981 | Murdock ................. 210/DIG. 5 |
| 4,722,800 | 2/1988 | Aymong ................. 210/DIG. 5 |
| 4,802,978 | 2/1989 | Schmidt et al. .............. 210/521 |
| 5,013,435 | 5/1991 | Rider et al. .................. 210/521 |

FOREIGN PATENT DOCUMENTS

| | | |
|---|---|---|
| 4001920 | 7/1991 | Germany . |
| 1477688 | 5/1989 | U.S.S.R. . |

Primary Examiner—Christopher Upton
Attorney, Agent, or Firm—James F. Weiler

[57] ABSTRACT

Disclosed is a liquid to liquid coalescing separator (10) in which the liquid flows through sides of upright perforated tubes (20). One of the liquids coalesces on the inner walls of the tubes until large enough to break away and flow out of internal passages in the tubes, and the other liquid free of coalesced liquid flows through the tubes and to an outlet (22).

12 Claims, 2 Drawing Sheets

LIQUID TO LIQUID COALESCING SEPARATOR AND METHOD

FIELD OF THE INVENTION

This invention is in the field of liquid to liquid coalescing separation.

BACKGROUND OF THE INVENTION

Coalescers are employed for separation of liquid to liquid suspension. Examples include the coalescing of water out of petroleum based products or the coalescing of petroleum based products out of water. Coalescers can be used for separating a variety of liquids from liquids, such as removing suspended hydrocarbon or oils from water, such as from tank farms, petroleum marketing facilities, refineries, utilities, gasoline stations, vehicle repair and maintenance shops, petrochemical plants, truck stops, parking lots, steel mills, storm water run off, surface run off, street wash waters, and the like. Various state and federal acts and regulations prohibit the discharge of any pollutants to United States navigable waters, pollution from natural storm water run off as well as illicit disposal in the storm sewers. Under current storm water regulations, drainage systems must be capable of removing contaminants, such as the petroleum hydrocarbons, from storm water run off at least down to 15 parts per million concentrations, which includes the removal of all free petroleum droplets equal to or greater than 20 microns in size.

Conventional methods of separating liquid droplets entrained in liquids, such as oil in water, include gravity separation, filtration, absorption, cohesion disposition, air floatation, microbiological, electrolytic, physical, chemical, and coalescing methods.

The following patents are illustrative of the state of the art developed in a preliminary search.

U.S. Pat. No. 2,651,414 illustrates a hydrocarbon separator apparatus which utilizes a cylindrical wall freely perforated or of expanded metal permitting relative free flow of liquid through it for separation.

U.S. Pat. No. 3,830,371 illustrates a liquid to liquid separator by passing through confined particle material which has an affinity for one of the liquids.

U.S. Pat. No. 4,231,867 discloses a method and apparatus for separating heterogenous fluids by flowing a gas through a liquid phase in a plurality of substantially vertical conduit members over a manifold member through which the gas is supplied, the gas carrying the liquid bubbles to the surface and circulating downwardly on the outside of the tubes.

U.S. Pat. No. 4,299,699 illustrates a back washable helical-media coalescer, the coalescer media composed of yarn-like material.

U.S. Pat. No. 4,479,875 illustrates an inlet distributor for a liquid-liquid separator including a distributor mounted within the separation zone provided with fluid openings having packing means disposed thereabout.

U.S. Pat. No. 4,919,777 discloses an electrostatic mechanical emulsion treating method and apparatus which includes an electrically grounded coalescing element comprising a multiplicity of longitudinally-extending downwardly inclined open ended tubes arranged in bundle fashion.

U.S. Pat. No. 5,028,323 discloses a filter for corrosive liquids which includes filter tubes formed from commercially available plastic tubes having multiple openings to provide for liquid passing between the inner and outer areas of the tubes.

U.S. Pat. No. 4,591,441 discloses a method and an apparatus for separating oil from water in which an oil water separating element consisting of specific porous material is used which includes a water insoluble hydrogel layer formed on the porous material surface and/or the surface of a fluid passage to be contacted with oil holding water.

U.S. Pat. Nos. 4,359,329 and 4,722,800 disclose separators provided with deflecting baffles and manways to provide access to the separator tank.

Commercial coalescers available on the market utilize mesh and plates to cause lighter oils to rise and coalesce into larger droplets which collect on the mesh or plates until they are large enough to break away and rise to the surface.

None of the foregoing patents or liquid to liquid coalescers available at present disclose, suggest, or use a liquid to liquid separator utilizing one or more upright or vertical coalescer tube assemblies of oleophilic, fiberglass composite or metallic materials having its side walls perforated so that the liquid flows into the tubes, small droplets of liquid coalesce on the inner walls of the tubes and increase in size until they break away thereby increasing the rate of rise of the droplets within the tubes, and liquid free of the coalesced droplets flows out of the tubes by which highly advantageous results are obtained.

SUMMARY OF THE INVENTION

The present invention is directed to apparatus and methods for separating first liquid droplets in second liquids, such as oil droplets from water, utilizing at least one coalescer assembly comprised of one or more tubes of geometric cross section having inner and outer walls and a passage therein and having perforations extending through the inner and outer walls of the tubes substantially along their lengths, the tubes being secured together in side by side relationship and formed of an oleophilic, fiberglass composite or metallic materials. The second liquid containing the first liquid droplets flows through the perforations in the outer wall into the internal passage, and coalesce on the inner wall until they are large enough to break away and flow upwardly in the interior passage thereby separating the first liquid droplets from the second liquid, such as oil droplets in water. The second liquid free of the coalesced liquid droplets flows through the perforations on the downstream side of the tube or tubes and out the bottoms of the tubes. Separate outlets in the separator are provided for removal of the second liquid free of the coalesced droplets and for removal of the coalesced droplets.

The influent inlet of the separator has a discharge end angled to distribute the influent evenly over a 315° to 345°, and probably a 325° arc to provide even flow distribution through the coalescer tube assembly. In addition, sludge baffles, manholes for cleaning the tank, making repairs, replacements, and the like are provided. The liquid to liquid coalescing separator may be underground or above ground, horizontal or vertical, as desired.

The coalescer separation is based on Stokes Law, and advantageously the separator can be built in accordance with American Petroleum Institute (API) manual entitled Disposal of Refinery Waste, Chapter 6.

Accordingly, it is an object of the present invention to provide an apparatus for separating liquid droplets from liquid by flowing through perforations in upstream side walls of one or more tubes of a material having an affinity for the liquid droplets, such as oleophilic, fiberglass composite, or metal materials depending on use, having inner passages therein, the liquid droplets to be separated coalescing on inner walls of the tubes until large enough to break away from the inner walls and flow in the inner passages out of the tubes, the liquid free of the coalesced liquid droplets flowing out of the inner passage through the perforations in downstream side walls and bottoms of the tubes thereby separating the two liquids.

A further object of the present invention is the provision of a liquid to liquid coalescing separator comprising a closed separator housing, inlet and outlet means in the housing for flow of the liquid-liquid into the closed housing and to discharge each of the liquids separately from the housing, and having at least one coalescer assembly disposed in the flow path in the housing between the inlet and outlet means, the coalescer assembly comprising at least one or more upright perforated tubes of geometric cross section having an axial passageway therein formed of a material having an affinity for the liquid to be coalesced, one of the liquids coalescing in droplets on the inner walls of the perforated tubes which increase in size until the droplets are large enough to break away and rise within the passage, and the other of the liquids free of the coalesced liquid droplets flowing through the perforations in downstream walls of the perforated tubes and out their bottoms thereby separating the liquids.

A further object of the present invention is to provide an improved coalescer assembly formed of one or more upright perforated tubes of geometric cross section having an internal passage formed of a-material having an affinity for the liquid to be coalesced, such of oleophilics, fiberglass composite and water material, liquid flowing into the passage through the upstream side of the wall of the tubes, droplets coalescing on inner walls of the tubes which increase in size until they are large enough to break away from the inner walls and rise to the surface, and liquid free of the coalesced droplets flowing out of the perforations in the downstream wall of the tubes.

It is a further object of the present invention to provide a coalescing liquid-liquid separation which is economical, effective, and which obtains improved results over the prior art.

It is a further object of the invention to provide such a liquid to liquid coalescing separator operated by gravity flow.

Other features and advantages of the present invention appear throughout the specification and claims.

DESCRIPTION OF PREFERRED EMBODIMENTS

Figure 1:
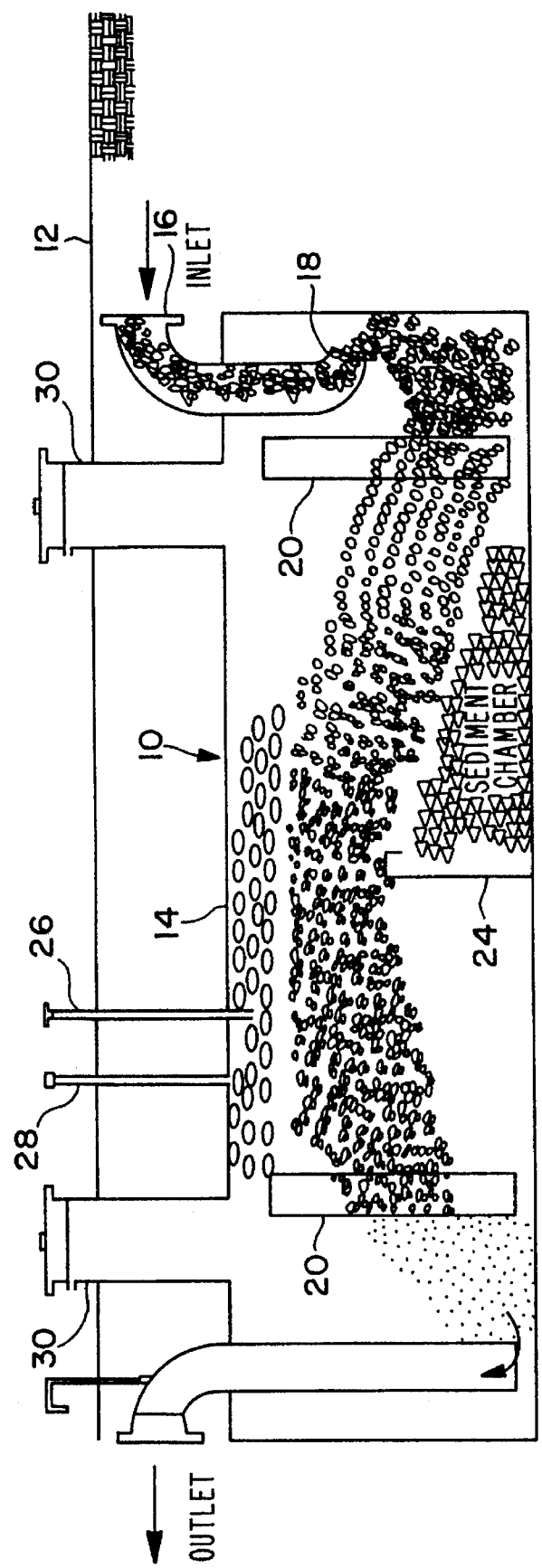
FIG. 1 is a side view, in section, illustrating a liquid in liquid coalescing separator according to the invention.

Referring now to FIG. 1, a separator 10 is shown as located beneath the surface of the ground 12. The separator 10 comprises a closed housing 14, here shown as a horizontal cylindrical tank, having an influent inlet 16 whose outlet end is angled toward the inlet end of the closed housing 14 to distribute the influent evenly over a 315° to 345°, and preferably a 325° arc at the inlet side of the separator 10. This flow pattern enhances solids settlement and even flow distribution through one or more coalescer tube assemblies 20, here shown as a pair of spaced coalescer tube assemblies 20, disposed in the path or flow of the influent in the closed housing 14. Any number or arrangement of coalescer tube assemblies 20 can be utilized to meet the conditions of use.

An outlet 22 is provided adjacent the discharge end of the tank 14 to discharge liquid free of coalesced droplets, such as oil droplets separated from wastewater. A sludge baffle 24 is disposed adjacent the bottom of the tank 14 between the coalescer 20 and the outlet 22.

As indicated in the drawing, an outlet 26 for petroleum product, such as oil, removal from the closed housing 14 is provided and a conduit 28 for an oil level control, not shown, is also provided. A closed manhole 30 is provided for entry into the tank for cleaning, making repairs and replacements, and the like.

Figure 2:
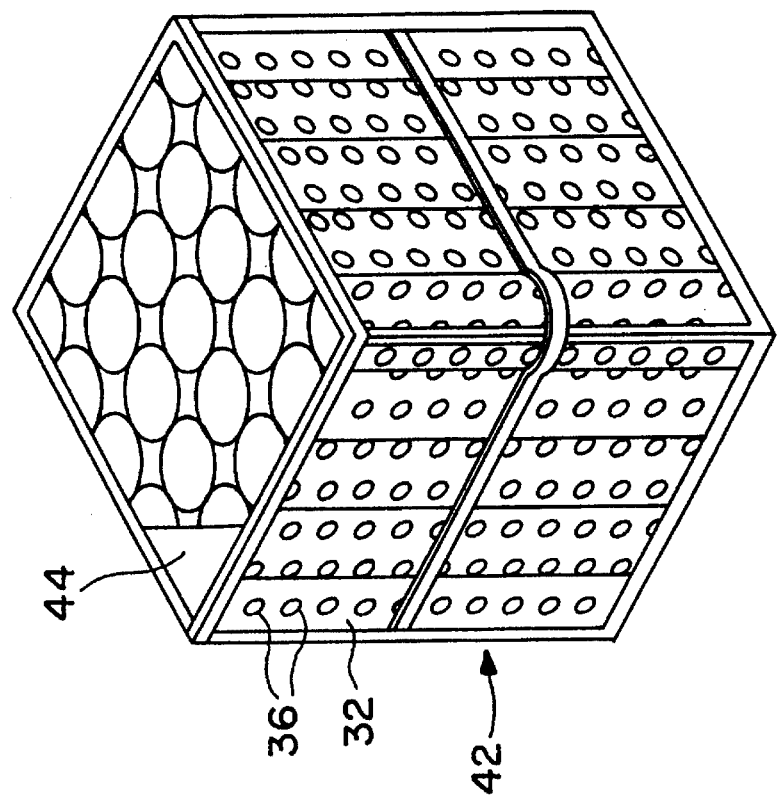
FIG. 2 is a perspective view of a coalescer assembly according to the invention utilized in the separator of FIG. 1.
Figure 4:
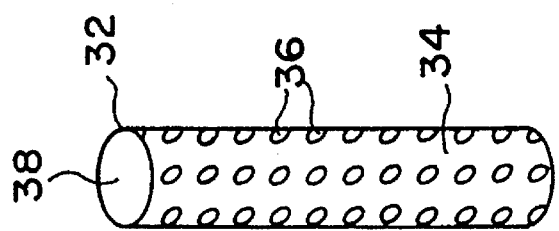
FIG. 4 is a side view of the tubular coalescer tubes illustrated in FIGS. 2 and 3.
Figure 3:
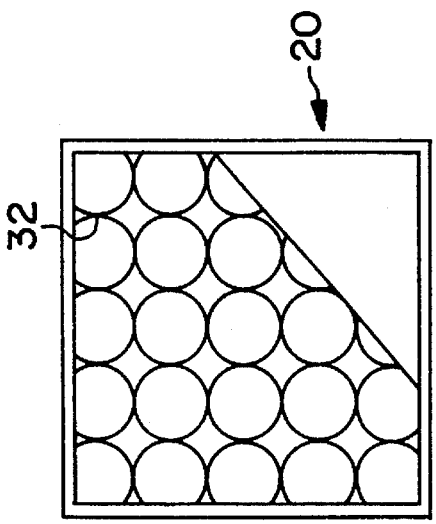
FIG. 3 is a top view of the coalescer assembly of FIG. 2.

Referring now to FIG. 2, the coalescer assembly 20 is illustrated which includes a plurality of tubes 32 of desired geometric cross section, here illustrated as tubular. The walls 34 of the tubes 32 have the perforations 36 spaced along their lengths and have internal passages 38 extending axially in the tubes 32 for flow of upstream influent through the perforation 36 into the interior passages 38. Droplets of one of the liquids coalesce on the inner walls 40 of the tubes 32 where the coalesced droplets increase in size until the droplets are large enough to break away from the inner walls 38 and rise by gravity to the surface in the passages 38 within the perforated tubes 32. The influent free of the coalesced droplets flows out of the perforations 36 on the downstream side of a tube 20 into the next tube where the coalescing as described is repeated, and so on until it flows out of the coalescer assembly 20, the first liquid in the second liquid, such as oil droplets in water, have coalesced and flow to the surface and the second liquid, such as water free of the coalesced droplets, flows out of the coalescer assembly 20. The liquid free of coalesced oil droplets, such as water, flows out the outlet 22, and the separated oil is removed from the tank 10 in the outlet 26.

The tubes may be of any desired cross sectional configuration, but preferably are of round cross section. Preferably, the coalescer tube assembly 20 provides a service area equivalent to one square foot per one gallon per minute of flow. For efficient results, the openings in the tubes 32 can range from ¼" to about ¾", preferably ½", and the diameter of the tubes can range from 1" to 4", preferably 2".

The tubes 32 are contained in an open sided and open top and bottom container 42 which has an expanded metal plate in the top and bottom 44 so that the liquid in liquid influent can flow through the coalescer assembly 20, the coalesced droplets can flow out the tops of the tubes 32, and the liquid free of the coalesced droplets can flow through the downstream sides of the tubes 32, and the solids can flow through the bottoms of tubes 32 of the coalescer assembly 20.

The material of which the tubes 32 can be formed includes any material which attracts or has an affinity for the droplets to be coalesced and can withstand the conditions of use. For example, for droplets of hydrocarbon or petroleum based products, an oleophilic material is used such as polyethylene or polypropylene for ambient temperatures up to about 150° F. For temperature above 150° F., preferably metal material is used. For corrosive liquids, fiberglass composite can be used.

If desired, to enhance coalescing within the vertical tubes 20, materials, not shown, such as polyethylene and/or polypropylene may be added. This increases the surface area within the tube assembly and therefore increases the efficiency of coalescing.

The polyethylene and/or polypropylene materials may consist of small diameter hollow tubes with internal configurations and known in the industry as pall rings, or may consist of a mesh type material of varying coarseness, which may be packed within the coalescer tubes 20.

The method of the invention for separating first liquid droplets in a second liquid, such as oil in water, comprises flowing them through perforations in upstream side walls of one or more tubes having inner passages therein, and formed of a material which attracts or on which the first liquid droplets coalesce, the first liquid droplets coalescing on inner walls of the tubes 32 until they are large enough to break away from the inner walls and flow in the inner passages out of the tubes thereby separating the first liquid droplets from the second liquid, the second liquid free of the coalesced first liquid droplets flowing out of the inner passage through the perforations in the downstream side of the walls of the tubes and their bottoms. As in the apparatus of the invention, the tubes are formed of a material attracting the droplets or on which they coalesce, and in the case of droplets of hydrocarbon based products in water, they are formed of polyethylene or polypropylene.

One or more coalescing units 20 may be employed, if necessary or desired. Also, level control devices for controlling the level of liquid in the separator 10 may be provided for automatic oil removal, and means for sludge draw off such as a pump may also be provided for withdrawing sludge from the bottom of the closed container 14. Emulsified liquid can be treated by utilizing an emulsion treatment, such as by lowering the pH of the liquid, heating the liquid, filtration or chemical addition, and the like prior to flow through the coalescer assembly 20. All of the foregoing are readily available on the open market, and no detailed description is given thereof or deemed necessary.

Advantageously, the separator can operate on a gravity principle and be located underground, as previously set forth.

Coalescer liquid-liquid separators according to the invention can be designed for a wide variety of uses and capacities. For example, for separation of oil droplets from water, coalescing separators according to the invention can be designed for capacities based on an influent of fresh water with a maximum free oil concentration of 200,000 mg/l with a specific gravity of 0.75–0.95 at a minimum temperature of 40° F., and for a minimum oil capacity equivalent to about 50 percent of the total tank volume. The total volume can range from 560 to 50,000 gallons having up to 50 percent hydrocarbon based wastewater, subsoil, capacity or 230 to 25,000 gallons at flow rates from 50 to 2,000 gallons per minute.

The present invention therefore is well adapted and suited to attain the objects and ends and has the advantages and features mentioned as well as others inherent therein.

While presently preferred embodiments of the invention have been given for the purpose of disclosure, modifications may be made therein which are within the spirit invention as defined by the appended claims.

What is claimed is:

1. Apparatus for separating a coalescent liquid contained in a first liquid comprising, a closed housing, inlet and outlet means in the housing for flow of the coalescent and first liquids into the closed housing in a flow path in the housing and flow of the first liquid free of coalesced droplets of the coalescent liquid out the outlet means, one or more coalescer assemblies disposed in the housing between the inlet and outlet means and in the flow path comprising one or more tubes of geometric cross section having perforated upstream and downstream sides to the flow path, internal passages therein throughout their lengths with open tops and open bottoms formed of a material on which the coalescent liquid will coalesce, the one or more tubes positioned in the flow path with the open bottoms spaced from the housing's bottom and the open tops spaced from the housing's top, whereby the coalescent and first liquids flow through the upstream perforated sides of the tubes into the internal passages therein, the first coalescent liquid coalesces into the coalesced droplets on inner walls of the internal passages of the tubes increasing in size until the coalesced droplets are large enough to break away from the inner walls and rise by gravity in the internal passages out the open tops of the tubes, the second liquid free of the coalesced droplets flows through the downstream perforated sides of the tubes, sludge from the second liquid flows by gravity out the open bottom of the tubes, means for removing the coalesced droplets from the closed housing, and means for removing the sludge from the bottom of the housing.

2. The apparatus of claim 1 where, the material from which the tubes are formed is selected from the group consisting of oleophilic, fiberglass composite and metal material.

3. The apparatus of claim 1 where, the material from which the tubes are made is selected from the group consisting of polyethylene and polypropylene.

4. The apparatus of claims 1, 2, or 3 where, the inlet means includes means to form the flow path of the second liquid containing the first liquid droplets in a 315° to 345° arc into the closed housing and then into the upstream perforated sides of the tubes.

5. In a coalescing separator apparatus for separating liquids, the improvement comprising coalescer assembly for separating a coalescent liquid from a first liquid comprising, one or more tubes of geometric cross section having inner and outer walls, interior passages having open tops and bottoms therein, and having perforations extending through the upstream and downstream walls of the tubes substantially along their lengths, the tubes secured together in side by side relationship, the tubes formed of a material, upon which the coalescent liquid coalesces, whereby the coalescent and first liquids flow through the perforations in the upstream walls into the interior passages and coalesce into coalesced droplets on inner walls until they are large enough to break away from the inner walls and flow by gravity in the interior passages and out the open tops of the tubes thereby separating the coalesced droplets from the first liquid, the first liquid free of the coalesced droplets flowing through the perforations in the downstream side out of the tubes, sludge from the second liquid flowing out the open bottoms.

6. The coalescer assembly of claim 5 where, the material of the tubes is selected from the group consisting of oleophilic, fiberglass composite and metal material.

7. The coalescer assembly of claim 6 where, the oleophilic material is selected from the group consisting of polyethylene and polypropylene.

8. A method of separating a coalescent liquid first liquid comprising, flowing the liquids through perforations in upstream side walls of one or more tubes having internal passages with an open top and an open bottom formed of a material on which the coalescent liquid will coalesce in coalesced droplets on inner walls of the tubes until they are large enough to break away from the inner walls and flow by gravity in the inner passages out of the upper open ends of the tubes thereby separating the coalesced droplets from the first liquid, flowing the first liquid free of the coalesced droplets out of the inner passage through the perforations in downstream side walls and bottoms of the tubes, and flowing sludge from the first liquid out of the bottoms of the tubes.

9. The method of claim 8 where, the material of which the tubes are formed is selected from the group consisting of oleophilic, fiberglass composite and metal material.

10. The method of claim 8 where, the material of which the tubes are formed is selected from the group consisting of polyethylene and polypropylene.

11. The method of claim 8 where, the coalescent liquid is selected from the group consisting of petroleum based products and the first liquid comprises water.

12. The method of claim 8 where, the outer wall surface area of the tubes is equivalent to one square foot per gallon of flow per minute of the first liquid containing the coalescent liquid through the perforations.

* * * * *